May 19, 1970 — P. H. EGLI — 3,513,439

ULTRASONIC BEAM TRANSDUCER

Filed Dec. 23, 1968

INVENTOR.
Paul H. Egli
BY
Paul & Paul
ATTORNEYS.

United States Patent Office 3,513,439
Patented May 19, 1970

3,513,439
ULTRASONIC BEAM TRANSDUCER
Paul H. Egli, Collingswood, N.J., assignor to Parke Davis & Company, Detroit, Mich., a corporation of Michigan
Filed Dec. 23, 1968, Ser. No. 786,258
Int. Cl. H04r 17/10
U.S. Cl. 340—10
12 Claims

ABSTRACT OF THE DISCLOSURE

An ultrasonic beam transducer of the concentric type is disclosed. The central disc transmitting element is a piezoelectric crystal having a cross-section of from 20 to 30 wavelengths. The receiving element, preferably a single continuous annular piezoelectric crystal encircling the transmitting crystal, has a width at any point of at least 10 and no more than 30 wavelengths. Each piezoelectric crystal is part of a coupled vibrating assembly which includes, in addition to the crystal, a resonant air column on the back side of the crystal, and an impedance matching layer of organic polymer on the front side, all of which assembly vibrates as a single unit to produce a search pattern over a small area which remains constant over a long distance.

BACKGROUND OF THE INVENTION

The acoustic beams from sound transducers normally spread out over a considerable angle and are dissipated over a large area at any appreciable distance from the transducer. Methods are known in the prior art to exercise some control over the shape of the acoustic beam to control the divergent angle, and, within limits, to bring it to focus at one chosen distance from the transducer face, but it has not heretofore been possible to maintain a good focus over a long distance.

With a normally spread beam, there is somewhat more sound energy at the center of the beam than near the outer edges of the beam pattern, and the prior art has developed techniques for scanning small targets by detecting peak power reflections. However, since a small target reflects only a tiny fraction of the total sound energy in a widespread sound beam, large amounts of acoustic power must be radiated to obtain a usable return signal.

There are many applications of ultrasonic transducers where it is important to search a small area at varying distances from the transducer, and where it is necessary that the total acoustic power radiated be small. For example, in medical diagnostic applications, the total acoustic power radiated into the patient must be limited to a small magnitude so as not to cause damage to the irradiated tissues. Also, in any battery powered system, and particularly in a battery powered system to be carried by a person under water, it is important that the acoustic power radiated be small in order to conserve the battery power and extend its length of service before the batteries fail.

SUMMARY OF THE INVENTION

A primary object of the present invention is to produce an ultrasonic transducer for obtaining useful acoustic reflections from a narrow path over a wide range of distances utilizing a small amount of sound energy.

Stated another way, the primary object is to utilize a small amount of power to obtain good acoustic reflection signals from a small area at varying distances by means of a novel transducer design.

The small area of search is achieved by the geometrical distribution of the vibrating elements of the transducer. The lower power consumption depends on the use of the novel coupled vibrating systems which will be described in detail later. In brief, the small collimated search area is produced by a vibrating crystal element having a cross section which is properly related to the wavelength of the radiated beam so that the radiated beam neither spreads excessively nor comes to a sharp focus at some single point in space. The receiving crystal element (or elements) peripherally surround the transmitting crystal. The receiving crystal may be a multiplicity of receiving crystals but is preferably a single annular receiving crystal. The back side of the transmitting and receiving crystals face a tuned air column which vibrates in resonance with the transmitting crystal. The face of the transmitting crystal is provided with an impedance matching layer.

More specifically, the present invention provides an ultrasonic transducer which comprises a central transmitting crystal element with a cross section of from twenty to thirty wavelengths surrounded by a series of crystal receiving elements, or preferably by a single continuous annular crystal receiving element, which is at least ten and no more than thirty wavelengths in diameter or width at any point. Each of the crystal transmitting and receiving elements are part of a coupled vibrating assembly or system which includes, in addition to the piezoelectric crystal plate, a resonant air column on the back side of the plate and a resonant impedance matching layer of organic polymer on the front side, all of which vibrates as a single unit. The whole assembly or system produces a search pattern over a small area which remains constant over a long distance.

DESCRIPTION OF THE PREFERRED EMBODIMENT

Figure 1:
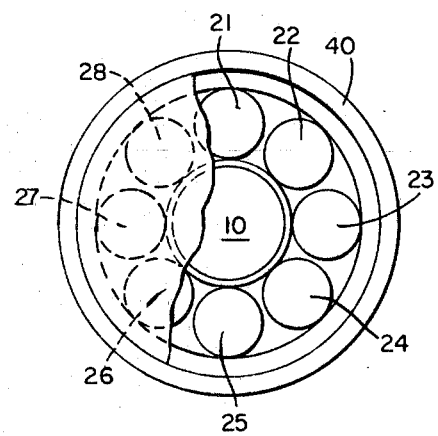
FIG. 1 is a diagrammatic plan view showing the geometric arrangement of transmitting and receiving crystal elements in one form of transducer.

FIG. 1 shows a transmitting element 10 surrounded by eight receiving elements 21–28.

Figure 3:
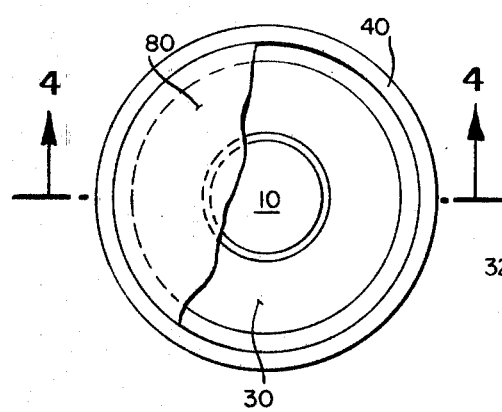
FIG. 3 is a diagrammatic plan view of a preferred form of transducer.

FIG. 3 shows a transmitting element 10 surrounded by a single annular receiving element 30.

I have discovered that to produce a small collimated search area, the diameter of the transmitting element is an important and controlling factor. A vibrating element with a very small cross section, compared to the wavelength, radiates a very broad beam. On the other hand, a vibrating element with a cross section many times as large as the wavelength, radiates a beam which is focused at some point in front of a transducer and spreads beyond that point in what may be called the far field. What is required is a transmitting element between these two extremes so that the radiated beam neither spreads excessively nor comes to a sharp focus at some single point in space.

Consider the example of the wavelength of sound in a typical saline solution at a frequency of five megacycles, which wavelength is 0.3 millimeter. To determine the optimum cross section for the transmitting crystal, it is necessary to recognize that a small area at the periphery of the circular disc element does not contribute to the coherent vibrating pattern because of inevitable interaction with edgewise vibrations, and also because of the fact that the perimeter is tightly clamped by dots of glue which attach the piezoelectric element to the holder.

I have discovered that to produce a weakly-focused relatively narrow angle transmitting beam the transmitting crystal should be from twenty to thirty wavelengths in cross section or diameter. For a frequency of five megacycles, this would be a diameter of from seven to ten millimeters, allowing for a one millimeter edge effect. At operating frequencies lower than five megacycles, the cross section or diameter of the vibrating transmitting element would be larger by an extent corresponding to the increase in wavelengths.

Referring now to the receiving elements, the cross section or width of the receiving crystal is less critical, and the choice of sizes is selected on the basis that, within practical limits of overall size of the transducer, a larger receiving area collects a larger total amount of reflected acoustic signal. However, if the receiving element becomes very large compared to the size of the target or the sound beam, the reflected signal will arrive at different times at the inside and outside edge portions of the receiver element and this would detract from the simple vibration wanted from a discrete receiving element. I have found that in the five-megacycle transducer, receiving elements 21–28 of from four to ten millimeters in diameter, corresponding to ten to thirty wavelengths, are satisfactory.

Figure 2:
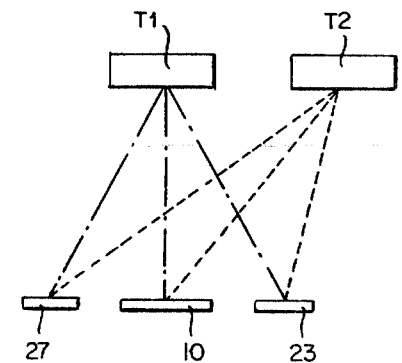
FIG. 2 is a diagram indicating the signal paths of transmitted and received acoustic energy to and from in-line and out-of-line targets.

The ability of the transducer to search a small area over a varying distance is based on spacing a multiplicity of receiving elements peripherally around the transmitting crystal so that reflections from a target arrive at different receiving elements at different times. This condition is depicted in FIG. 2 of the drawing. If a small target is dead ahead of the transmitting element 10, such as target T1 in FIG. 2, the cone of reflected acoustic energy will arrive at all receivers 21–28 of FIG. 1 (all of which are connected in series) at precisely the same time, and the signal generated by each receiver 21–28 will be additive. If, however, the target is placed at an angle from the center of the transmitted beam, such as depicted by target T2 in FIG. 2, the reflected signal will arrive at each receiving element 21–28 at different times with the result that some of the receivers 21–28 are out of phase with others of the receivers and the integrated sum of the several receivers 21–28 is accordingly much reduced. The combined effort of a narrow poorly-focused transmitting beam with peripherally spaced receivers which receive signals from off-center targets at different times results in a device which has the effect of being highly collimated, producing strong signals only from small targets directly ahead over a wide range of distances.

It has been demonstrated that the multiple receiving elements 21–28 shown in FIG. 1 can be replaced by a single annular receiving element 30 as shown in FIG. 3, provided that the single annular element 30 is a high Q vibrating element such as quartz so that vibrations initiated at any point are transmitted with little loss across the whole element.

It has been previously described above how to determine the proper diameter for a discrete receiving element 21–28 of the configuration shown in FIG. 1. If a single annular receiving element 30 is used in conjunction with a proper transmitting beam, reflected signals from off-axis targets will arrive at some points on the receiving element 30 out of phase with signals arriving at other points, and the resulting complex out-of-phase vibrations in the single annular shaped receiving element 30 reduces the signal generated, compared to the reflected energy from targets dead ahead which arrive at all points on the annular receiving element 30 simultaneously and thus generate a strong coherent signal.

I have found that using a transducer of the dimensions described, the effective target area is approximately only ten millimeters in diameter from a distance of ¼ inch in front of the transducer continuously to a distance of 3 feet in front of the transducer, and the effective target area increases only to about twenty millimeters even at a distance of 20 feet from the transducer.

Figure 4:
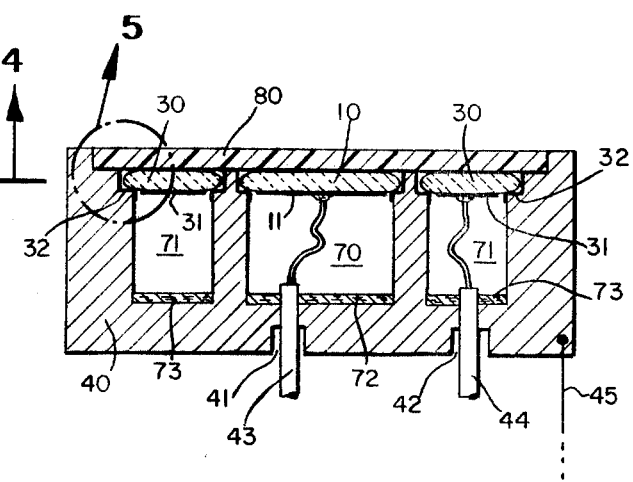
FIG. 4 is an enlarged side elevational view of the transducer, as seen looking along the line 4—4 of FIG. 3.

Referring now to FIG. 4, this figure is an elevational view, in section, of the transducer of FIG. 3, looking along the line 4—4 of FIG. 3. An elevational view, in section, of FIG. 1 would also be similar to FIG. 4. FIG. 4 shows the parts comprising the vibrating transducer assembly or system designed and developed to conserve power and obtain useful signals from the small amount of reflected acoustic energy intercepted by the receiver. In the transducer system shown in FIG. 4, each of the vibrating sections of the system, whether it be the transmitting section, or a group of discrete receiving sections, or a single annular receiving section, comprises three parts.

The first of the parts of each vibrating section, and the heart of the coupled vibrating system of FIG. 4, is the piezoelectric crystal element 10, or 21–28, or 30. For frequencies in the megacycle range, the piezoelectric element 10, or 21–28, or 30 is preferably X-out quartz because of its simple clean mode of longitudinal vibration normal to the axis of the crystal plate. At kilocycle frequencies, ammonium phosphate crystals would become the preferred piezoelectric element. The various piezoelectric ceramics, such as titanates and zirconates, would work in any frequency range with some loss in certain electrical characteristics and in the clean simple mode of vibration with relatively little cross-coupled vibrations achieved with single crystals.

As shown in FIG. 4, the second part of each vibrating section is a tuned air column 70 or 71 which vibrates in resonance with the crystal. For transducers which are to operate in water, the undesired vibrations from the back side of the crystals have, in the prior art, usually been dampened in some fashion to prevent reflections from the back from interfering with the desired vibrations in the water. One common form of damping is to mount the crystals on an acoustic energy-absorbing material, such as cork, but because material such as cork are neither perfectly elastic nor perfectly sound absorbing, the desired free vibration is somewhat reduced.

Another procedure which has been used in the prior art is to use an air cavity behind the crystal and to depend on the impedance mismatch of acoustic vibrations in air and in crystals to reduce the effective backward reflective energy. While this method is very helpful, there is still a small amount of reflected energy which interferes with the desired clean vibration in the forward direction.

In the system of the present invention, as illustrated in FIG. 4, each air cavity 70 and 71 is designed so that the small amount of reflected energy is in resonance with the crystal 10, or 21–28, or 30, and reinforces the desired forward vibration. Each cavity 70 and 71 is thus rather long to reduce reflections from the side of the cavity, and may, in some cases, be backed with absorbing material 72, 73 to further reduce the total reflections, but an important feature is that each cavity 70, 71 has dimensions such that the reflected energy is in phase with the vibrating crystal 10, or 21–28, or 30. The length of the cavity is thus a multiple of the wavelength of the particular frequency in air. For five megacycles, the wavelength is .006 millimeter in dry air, and the preferred cavity length is 5.28 millimeters, or 88 times the wavelength.

In FIG. 4 the third part of the coupled vibrating system (which resonates as a single unit) is an impedance matching layer 80 between the crystal vibrating elements 10 and 30 and the water or other medium into which the transducer operates. The function of the impedance matching layer 80 may be compared to the use of non-reflective coating on glass, or the use of several compositions of glass in lens design to avoid reflections that occur at abrupt changes in refractive index for light transmission. Similarly, in acoustic transmissions there are appreciable reflection losses at interfaces of sharply different acoustic impedance. The boundary between crystals 10 and 30 and water would be an example of such a sharply different acoustic impedance interface. The acoustic impedance is the product of the density and the sound velocity, which for quartz is 14.4 g./cm.$^2$ sec. ($10^{-5}$) and for saline solution is 1.5 g./cm.$^2$ sec. ($10^{-5}$).

A number of organic high polymers have acoustic impedances intermediate between those of quartz and water and thus these polymers can serve the function of an impedance matching element in the coupled vibrating system of the present invention shown in FIG. 4. In Lucite and nylon, for example, a two-wavelength thick section at five megacycles is 0.98 millimeter, which is adequate for the purpose. Other polymers, such as silicone compounds and polypropylene, can also be used with slight adjustments in thickness.

Use of the coupled systems illustrated in FIG. 4 and described above, as vibrating elements in the geometrical configuration shown in FIGS. 1 and 3, creates a transducer having the desired sharply focused scan area over a wide range of distance, with good echo signals from a small amount of electrical and acoustic power, for use in either a pulsed mode or a continuous mode of operation. When used in the pulsed transmitter mode, for simple echo ranging for distance measurement of small targets, there is an important advantage in identifying the size of the objects because the beam searches the same area regardless of distance. Similarly, when the transducer is used in a continuous transmitting mode for amplitude modulation and frequency shift ultrasonic devices, rate of movement and size are more accurately measured at any distance because the target area scanned is small and of constant size with distance. These are particularly important features in biological diagnostic applications, such as determining the size of enlargements of heart walls.

Figure 5:
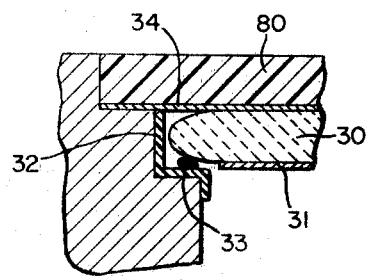
FIG. 5 is an enlarged view of that portion of FIG. 4 identified by the circle 5.

The remainder of the transducer assembly or system shown in FIG. 4 will be but briefly described. FIG. 5 is an enlarged view of that portion of FIG. 4 shown in the circle 5. The casing or housing 40, which may be of brass, is provided with small openings 41 and 42 in the base through which pass insulated leads 43 and 44 leading respectively to the center of the underside of the transmitting crystal 10 and to the annular receiving crystal 30. The under or back face of each of the crystals 10 and 30 is covered with conductive material such as gold foil (or a gold deposition) identified as 11 and 31, respectively, which stops short of the edges of the crystals so as to assure no contact with the brass casing 40. Insulation 32 is provided, as best seen in FIG. 5, to prevent contact between the gold foil 11 or 31 and the casing 40. The crystals 10 and 30 are secured to the casing 40 only at their edges as by tiny dots of glue or cement 33, as seen in FIG. 5. Preferably such glue dots 33 may be at 90° spacing, so that each edge of each of the crystals 10 and 30 is held in place by four dots of glue, thereby allowing for maximum freedom of vibration of the crystals. To avoid congestion in the drawing, the glue dots are omitted in FIG. 4.

To avoid or reduce edge effects, each edge of each of the crystals 10 and 30 is rounded, as best seen in FIG. 5, into a hyperbole shaped edge.

The upper or forward face of the crystals 10 and 30 is covered with conductive material, such as gold foil (or gold deposition) 34 which extends all the way to, and makes good contact with, the brass casing 40. A common lead 45 connects to the casing 40. The leads to the under face of the crystals 10 and 30 are light weight and are secured to the crystals by small dots of solder. Sufficient lengths of leads are provided to allow for freedom of vibration of the crystals in accordance with the energy applied thereto.

What is claimed is:
1. An ultrasonic transducer comprising:
 (a) a central transmitting element, said transmitting element having a cross-sectional dimension of between fifteen and thirty-five wavelengths at the operating frequency;
 (b) receiving element means surrounding said central transmitting element, said receiving element means having a width at any point of between ten and thirty-five wavelengths at the operating frequency; each of said transmitting and receiving elements comprising:
 (c) a piezoelectric material;
 (d) means providing an air column on the back side of said piezoelectric material;
 (e) an impedance-matching layer of organic polymer on the front side of said piezoelectric material; said piezoelectric material, air column, and impedance-matching layer forming a coupled vibrating system which vibrates as a single resonant unit at the operating frequency.

2. An ultrasonic transducer according to claim 1 characterized in that the central transmitting element is a circular disc and in that said receiving element means surrounding said central transmitting element comprises a single continuous annular receiving element.

3. An ultrasonic transducer according to claim 1 characterized in that the means for providing a resonant air column comprise a housing having a cavity at the back side of said piezoelectric material having a length of the order of between fifty and one hundred times the wavelength in dry air.

4. An ultrasonic transducer according to claim 2 characterized in that the means for providing a resonant air column comprise a housing having a cavity at the back side of said piezoelectric material having a length of the order of between fifty and one hundred times the wavelength in dry air.

5. An ultrasonic transducer according to claim 1 characterized in that said transmitting and receiving elements are X-cut quartz crystal.

6. An ultrasonic transducer according to claim 2 characterized in that said transmitting and receiving elements are X-cut quartz crystal.

7. An ultrasonic transducer according to claim 3 characterized in that said transmitting and receiving elements are X-cut quartz crystal.

8. An ultrasonic transducer according to claim 1 characterized in that the central transmitting element is a circular disc and in that said receiving element means comprise a series of receiving elements encircling said transmitting element.

9. An ultrasonic transducer according to claim 8 characterized in that the means for providing a resonant air column comprise a housing having a cavity at the back side of said piezoelectric material having a length of the order of between fifty and one hundred times the wavelength in dry air.

10. An ultrasonic transducer according to claim 8 characterized in that said transmitting and receiving elements are X-cut quartz crystal.

11. An ultrasonic transducer according to claim 9 characterized in that said transmitting and receiving elements are X-cut quartz crystal.

12. An ultrasonic transducer according to claim 1 characterized in that said transmitting element has a cross-sectional dimension of between twenty and thirty wavelengths at the operating frequency,
 and in that said receiving element means has a width at any point of at least ten and no more than thirty wavelengths.

References Cited
UNITED STATES PATENTS 3,277,451  10/1966  Parssinen _____ 340—10 X
3,457,543  7/1969  Akervold et al. _____ 340—10

RICHARD A. FARLEY, Primary Examiner

B. L. RIBANDO, Assistant Examiner

PO-1050
(5/69)

UNITED STATES PATENT OFFICE
CERTIFICATE OF CORRECTION

Patent No. 3,513,439      Dated May 19, 1970

Inventor(s) Paul H. Egli

It is certified that error appears in the above-identified patent and that said Letters Patent are hereby corrected as shown below:

Column 4, line 63, For ".006" read ".066".

Column 4, line 64, For "88" read "80".

SIGNED AND
SEALED
NOV 17 1970

(SEAL)
Attest:

Edward M. Fletcher, Jr.
Attesting Officer

WILLIAM E. SCHUYLER, JR.
Commissioner of Patents